United States Patent [19]

Olds et al.

[11] 3,710,197

[45] Jan. 9, 1973

[54] POWER INTERLOCK FOR ELECTRONIC CIRCUIT CARDS

[75] Inventors: Richard G. Olds, Garden City; Eugene P. Bonzack, Livonia, both of Mich.

[73] Assignee: Westinghouse Electric Corporation, Pittsburgh, Pa.

[22] Filed: Feb. 11, 1971

[21] Appl. No.: 114,505

[52] U.S. Cl. ....................317/118, 174/68.5

[51] Int. Cl. ....................H02b 1/06

[58] Field of Search....317/101 CM, 101 C, 101, 101 DH, 317/118; 174/68.5; 339/17 R, 17 C, 17 L, 17 LC, 17 M

[56] References Cited

UNITED STATES PATENTS

| | | | |
|---|---|---|---|
| 2,928,063 | 3/1960 | Gammel | 339/17 L |
| 3,008,245 | 11/1961 | Meuche | 317/101 C |
| 3,024,436 | 3/1962 | Kirk | 339/17 L |
| 3,278,714 | 10/1966 | Bernutz | 317/101 DH |
| 3,492,538 | 1/1970 | Fergusson | 317/101 DH |
| 3,533,045 | 10/1970 | Henschen | 317/101 DH |
| 3,485,934 | 12/1969 | Prather | 317/101 CM X |
| 3,437,977 | 4/1969 | Gammel, Sr. et al. | 174/68.5 X |
| 3,491,267 | 1/1970 | Goshorn | 174/68.5 X |
| 2,760,127 | 8/1956 | Duncan et al. | 317/101 C X |
| 3,433,888 | 3/1969 | Tally et al | 174/68.5 |
| 2.965,811 | 12/1960 | Batcher | 317/101 X |

*Primary Examiner*—Richard B. Wilkinson
*Assistant Examiner*—U. Weldon
*Attorney*—A. T. Stratton and Clement L. McHale

[57] ABSTRACT

An electronic circuit card having a plurality of aligned terminals which are engageable with corresponding terminals in a terminal block. The construction of a particular terminal on the card is such that it is the last terminal on the card to make contact with a terminal in the terminal block when the card is inserted into the block. This particular terminal on the card is electrically connected to another terminal on the card. The card and the terminal block are constructed such that power to the circuit components on the card can be supplied only through these two terminals when the card is fully inserted into the block. This arrangement prevents power from being applied to the components on the card until all the terminals on the card are properly engaged with the terminals in the terminal block. Similarily, when the card is removed from the block the power circuit is the first to be disconnected.

5 Claims, 5 Drawing Figures

INVENTORS
RICHARD G. OLDS
EUGENE P. BONZACK
BY
Barnes, Kisselle, Raisch & Choate
ATTORNEYS

POWER INTERLOCK FOR ELECTRONIC CIRCUIT CARDS

This invention relates to electronic circuit cards and more specifically to plug-in type cards which are used in electronic controllers for apparatus such as a machine tool.

The use of plug-in type electronic circuit cards in an electronic controller permits the packaging and arrangement of the electronic circuitry therein to be both reasonably compact and conveniently accessible. Each card comprises a flat board usually of glass phenolic on which are mounted various electronic components which are electrically connected in circuit. Usually a row of aligned terminals is provided adjacent an edge of the board and these are electrically connected to the components thereon. This edge of the circuit card is inserted into a terminal block to register the terminals on the card with corresponding terminals in the terminal block. The terminals in the terminal block are in turn wired to other terminals in the same or other terminal blocks to electrically integrate the circuitry on the card with the circuitry on other cards in accordance with the overall design of the controller. The particular advantage of plug-in type cards resides in the ease with which faulty electronic components may be replaced. Whenever a component fails, the card on which it is located is simply replaced by a new card.

In many applications electric power is supplied directly to a circuit card through a terminal in the terminal block in which the card is mounted. A serious problem can arise if the card is removed from the block when the power terminal is "hot." Since it is virtually impossible to remove a circuit card from a terminal block such that the electrical connections between all the corresponding terminals on the block and card are simultaneously broken, some of the terminals may be disconnected before the power is removed from the card. When the circuitry on the card forms a portion of the control logic, the disconnection of some of the terminals before the power terminal is disconnected may seriously disrupt the control logic. In the case of a machine tool controller such signals may generate unwanted movements in elements of the machine.

Therefore, it is the primary object of this invention to provide an improved electronic circuit card which, upon being removed from a terminal block, disconnects the power circuit to the card before any of the other circuits which are connected to the terminal block are disconnected.

Another object of this invention is to provide an improved electrical power interlock for an electronic circuit card.

Other objects and features of the invention will become apparent in the following description and drawings in which.

Figure 1:
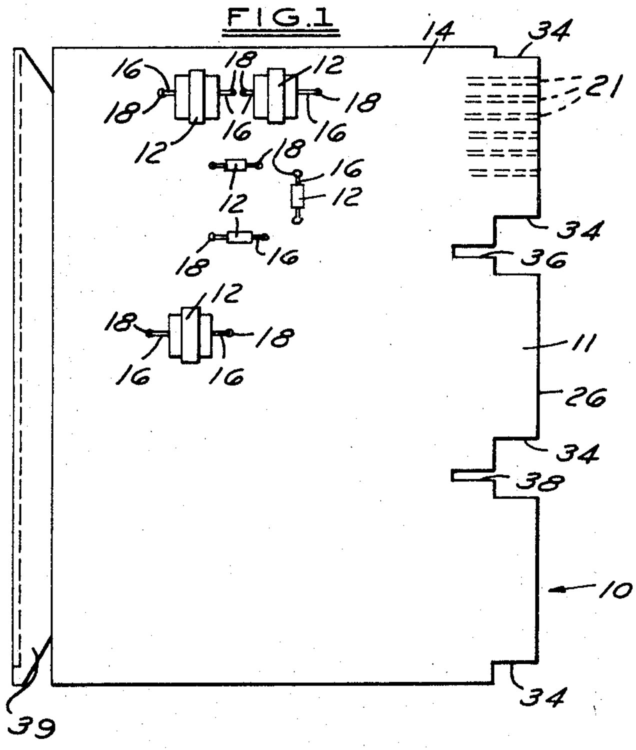
FIG. 1 is a plan view of the face side of the improved circuit card of the present invention.
Figure 2:
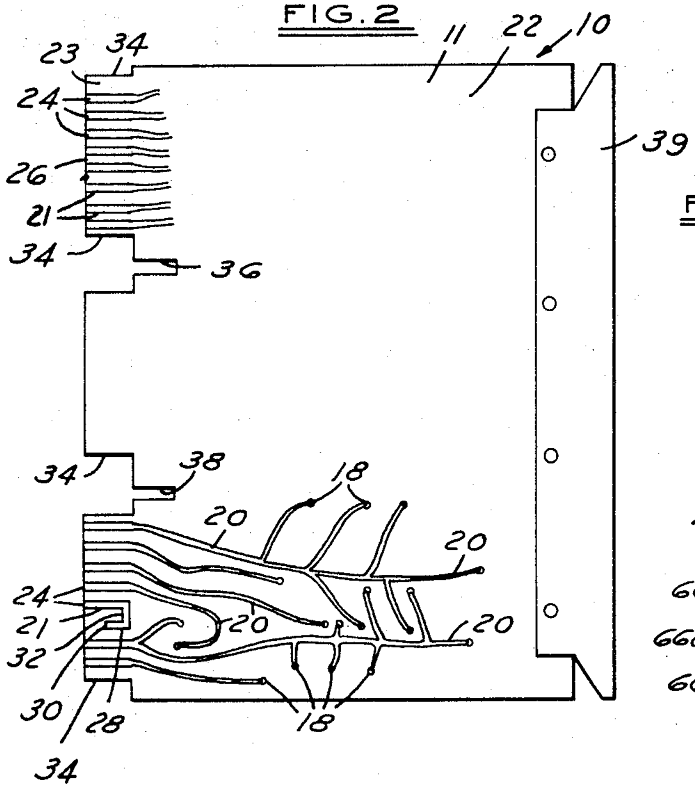
FIG. 2 is a view of the obverse side of the card of FIG. 1.

Referring now to FIGS. 1 and 2, the improved circuit card 10 of the present invention comprises a flat, rigid, glass phenolic board 11 which is generally rectangular in shape. A plurality of electronic circuit components 12 are mounted on the face side 14 of board 11. Components 12 are electrically connected by leads 16 through small holes 18 in board 11 to a plurality of conductive paths 20 on the obverse side 22 of board 11. The conductive paths 20 terminate in a plurality of flat conductive terminals 21 aligned in a vertical row along the rear border 23 of obverse side 22.

Each terminal 21 is generally rectangular in shape and the rearmost portion 24 thereof terminates at the rear edge surface 26 of board 11. A shorter terminal 28 is also included in the row of aligned terminals 21. However, the rearmost portion 30 of terminal 28 terminates at a point spaced forwardly of the rearmost portions 24 of terminals 21. A flat conductive strip 32 extends transversely between the forward portions of terminal 28 and the terminal 21 upwardly adjacent terminal 28 such that a conductive path is established therebetween. The rear portion of board 11 is provided with a plurality of four notches 34 to permit card 10 to be inserted into a terminal block as will soon become apparent. The forward portions of the two intermediate notches 34 are reduced as at 36 and 38 to extend forwardly perpendicular to rear edge surface 26. A rigid panel 39 is attached to the front of board 11 and may be manually gripped to insert and remove card 10.

Figure 4:
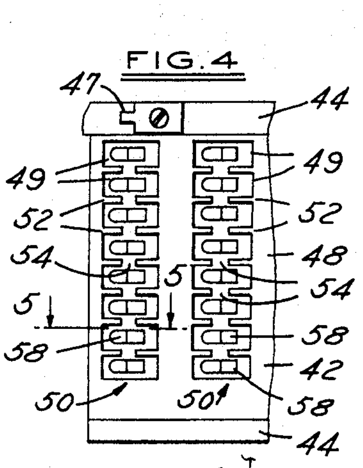
FIG. 4 is a fragmentary sectional view taken along line 4—4 in FIG. 3.
Figures 3, 5:
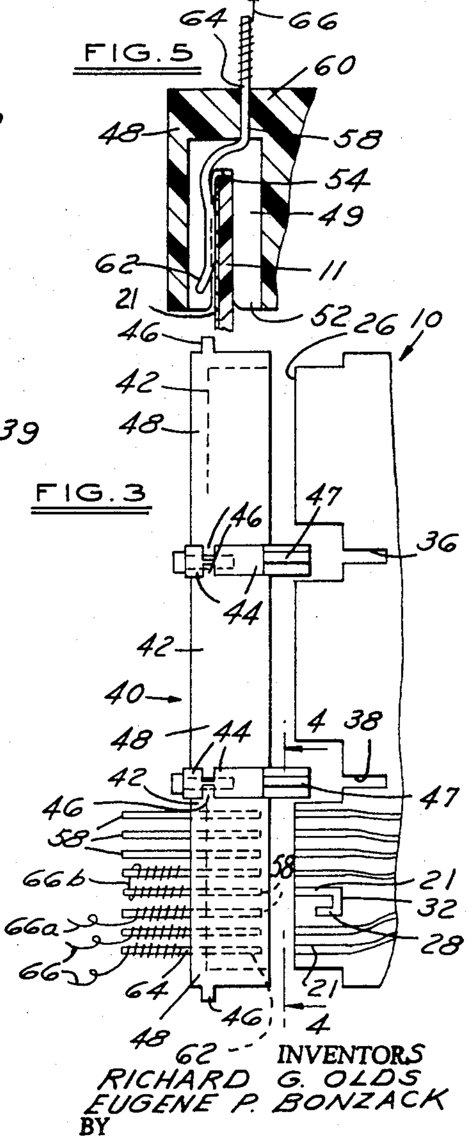
FIG. 3 is a side view of the terminal block into which the card of FIG. 1 is being inserted.
FIG. 5 is an enlarged fragmentary sectional view taken along line 5—5 in FIG. 4.

Referring to FIGS. 3, 4 and 5, the rear portion of board 11 is adapted to be inserted into a terminal block 40. Terminal block 40 comprises three vertically aligned terminal block units 42. The three units 42 are secured together by rails 44 which sandwich horizontal flanges 46 on the upper and lower surfaces of each unit 42. Two keys 47 are mounted on the front of the forward rail 44 and extend perpendicularly forwardly of the units 42. Each unit 42 comprises a generally rectangular block 48 which is molded to form a plurality of sockets 49 which are aligned in vertical rows 50. Each socket 49 extends rearwardly from the front of block 48. A horizontal partition 52 separates each socket 49 and includes a straight slot 54 extending rearwardly from the front edge thereof. Slots 54 are vertically aligned with keys 47. An electric terminal 58 is staked to the rear wall 60 of each socket 49 and comprises a forward spring blade 62 and a rear pin 64. A wire 66 is wrapped to selected pins 64 in accordance with the design of the controller.

Before insertion of card 10 into terminal block 40 the blades 62 in the row 50 into which card 10 is to be inserted are vertically aligned with slots 54 in that row. As card 10 is inserted into terminal block 40, the rear edge surface 26 of board 11 bodily deflects terminals 58 in cantilever fashion out of alignment with slots 54 so board 11 may be positioned within slots 54. With card 10 fully inserted, the spring force in each terminal 58 maintains the terminal in contact with the terminals 21 and 28 on board 11 to establish electrical connections therebetween. In this position keys 47 are fully inserted within notches 36 and 38.

One of the two terminals 58 which engage terminal 28 and the terminal 21 to which terminal 28 is electrically connected by its wire **66*a* directly to a power supply (not shown). The other of the two terminals 58** is electrically connected by its wire **66*b* to a third terminal 58. The terminal 21 which engages this third terminal 58 is connected to the conductive path 20 on board 11 through which power to various components 12 is supplied. Hence, power to these components is available only when these three terminals 58 are engaged with the corresponding terminals on board 11**.

The close engagement of notches 36 and 38 with keys 47 constrain card 10 for removal from terminal block 40 in a direction perpendicular to the block. As card 10 is removed, the first connection to be broken is between terminal 28 and its corresponding terminal 58 in block 40. The rearmost portion of terminal 28 is sufficiently forward of the rearmost portions of terminals 21 such that when this connection is broken, the connections between terminals 21 and their associated terminals 58 remain unaffected. Hence the circuit path, which supplies power to the components 12 on board 11 is interrupted to remove power from the card. Thus, terminal 28 provides an electrical power interlock for card 10.

It should also be noted that when card 10 is inserted into block 40 the power circuit is the last circuit connected, and consequently power is not supplied to the components on the card until the other terminals 21 are properly engaged with the terminals 58 in block 40. Likewise in some terminal block constructions it should be appreciated that keys 47 are not required and that other suitable means may be used for guiding the card into the block such that the power circuit is the last circuit to be connected upon insertion and the first to be connected upon removal of the card.

We claim:

1. In combination a terminal block having a plurality of aligned electrical terminals and an electronic circuit card comprising a generally planar board having forward and rear portions, a plurality of electronic components on said board and a plurality of aligned electrical terminals on said board engageable with the terminal in the terminal block, said terminals in the terminal block including a first terminal electrically connected to a power supply and second and third terminals electrically connected together, said terminals on said card including a first terminal engageable with one of said first two mentioned terminals in said terminal block and a second terminal engageable with the other of said first two mentioned terminals in the terminal block and a third terminal on said card engageable with the third terminal in said block for conducting electric current from said power supply to the circuitry on said card, said first terminal on said board having its rearmost portion spaced forwardly of the rearmost portion of said second terminal on said board and means on said board forming a conductive path between said first and second terminals on said board.

2. The combination of claim 1 further including means on said terminal block and said card for guiding said terminals on said card into engagement with said terminals in said terminal block as said card is inserted into said terminal block.

3. The combination of claim 1 wherein said first and second terminals on said board comprise generally flat conductive paths on the surface of said board.

4. The combination of claim 3 wherein said paths are parallel.

5. The combination of claim 4 wherein said means forming a conductive path between said first and second terminals comprises a flat conductive path on said board extending transversely between said first and second terminals on said board.

* * * * *